US008027815B2

(12) United States Patent
Ivengar

(10) Patent No.: US 8,027,815 B2
(45) Date of Patent: Sep. 27, 2011

(54) SYSTEM AND METHOD FOR DETECTING GENERALIZED SPACE-TIME CLUSTERS

(75) Inventor: Vijay S. Ivengar, Cortlandt Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 807 days.

(21) Appl. No.: 11/751,998

(22) Filed: May 22, 2007

(65) Prior Publication Data
US 2008/0294394 A1 Nov. 27, 2008

Related U.S. Application Data

(63) Continuation of application No. 10/777,548, filed on Feb. 12, 2004, now Pat. No. 7,343,272.

(51) Int. Cl.
*G06F 7/60* (2006.01)
*G06F 17/10* (2006.01)
(52) U.S. Cl. ............................................. 703/2
(58) Field of Classification Search ........................ 703/2
See application file for complete search history.

(56) References Cited

U.S. PATENT DOCUMENTS
| | | | |
|---|---|---|---|
| 6,229,918 B1 | 5/2001 | Toyama | |
| 2006/0142944 A1* | 6/2006 | Orwant | 702/3 |
| 2009/0125321 A1* | 5/2009 | Charlebois et al. | 705/1 |

OTHER PUBLICATIONS

Martin Kulldorff, "Spatial Scan Statistics: Models, Calculations, and Applications", 1999, Birkhuser, From book: "Scan Statistics and Applications"ISBN: 978- 0-8176-4041-5; pp. 303-319.*
Levshin, A., "Application of a Global 3D Model to Improve Regional Event Locations", 2002, Springer Netherlands, Studia Geophysica et Geodaetica vol. 46 Issue: 2, pp. 283-292.*
Rakesh Agrawal, Automatic Subspace Clustering of High Dimensional Data for Data Mining Applications, Proceedings of the ACM-SIGMOD, International Conference on Management of Data, 1998.
Martin Kulldoff, A Spatial Scan Statistic pp. 1481-1497. Commun. Statist.—Theory Meth., 26(6), (1997).
Editors: Joseph Glaz and N. Balakrishnan; Title: Scan Statistics and Applications; Date: 1999; Publisher: Birkhauser; ISBN:978-0-8176-4041-5; pp. 303-319.

(Continued)

*Primary Examiner* — David Silver
(74) *Attorney, Agent, or Firm* — F. Chau & Associates, LLC; Anne V. Doughtery, Esq.

(57) ABSTRACT

A system for detecting clusters in space and time using input data on occurrences of a phenomenon and characteristics at a plurality of locations and times comprises an expectation generation module determining expected occurrences of a phenomena, and an occurrence modeling module determining actual occurrences of the phenomena. The system further comprises a search module searching the expected occurrences and the actual occurrences for a plurality of candidate solutions, wherein each solution is represented as a set of points in the three-dimensional space, and wherein each point corresponds to a location at a time. The system comprises a convex container module determining at least one solution corresponding to a selected convex container shape from the plurality of candidate solutions, and a solution evaluation module determining a strength metric for each solution determined by the convex container module, the search module selecting a dominant cluster in the input data.

18 Claims, 9 Drawing Sheets

OTHER PUBLICATIONS

Authors: M Kulldoff, N Nagarwalla; Title: Spatial Disease Clusters: Detection and Inference; Data Apr. 30, 1995; Publisher: John Wiley & Sons, Ltd., Journal Statistics in Medicine; vol. 14; pp. 799-810.

Authors: M Kulldoff, W F Athas, E J Feurer, B A Miller, and C R Key; Title: Evaluating Cluster Alarms: a spare-time scan statistic and brain cancer in Los Alamos, New Mexico; Date: Sep. 1998; Journal: American Journal of Public Health; vol. 88, No. 9; pp. 1377-1380.

* cited by examiner

SYSTEM AND METHOD FOR DETECTING GENERALIZED SPACE-TIME CLUSTERS

CROSS-REFERENCE TO RELATED APPLICATION

This is a Continuation Application of U.S. application Ser. No. 10/777,548 filed on Feb. 12, 2004 now U.S. Pat. No. 7,343,272, the disclosure of which is herein incorporated by reference in its entirety.

GOVERNMENT LICENSE RIGHTS

This invention was developed under Government Contract (DARPA Project F30602-01-C-0184). The U.S. Government has rights to this patent application.

BACKGROUND OF THE INVENTION

1. Field of Invention

The present invention relates to modeling space-time data, and more particularly to detecting three-dimensional convex clusters in space and time for a phenomenon.

2. Discussion of Related Art

Detection of clusters in space and time, called space-time clusters, is an important function in various domains. For example, detection of such clusters is an important part of the investigation of disease outbreaks in the domain of epidemiology and public health. Other domains of application include medical imaging, urban planning and reconnaissance. The notion of what constitutes a cluster depends on the domain. For example, the spatial scan statistic as described in the paper "A spatial scan statistic" by Martin Kulldorff in Communications in Statistics; Theory and Methods, Volume 26, Number 6, 1997, is widely used in the epidemiology and public health domain. Other models of clustering might be appropriate in other domains.

Methods for detecting clusters may be developed depending on the clustering notion used. For example, the use of the scan statistic implies that earlier hierarchical approaches (see for example, "Automatic subspace clustering of high dimensional data for data mining applications" by R. Agrawal, J. Gehrke, D. Gunopuios, and P. Raghavan in Proceedings of the ACM-SIGMOD International Conference on Management of Data, 1998) to clustering cannot be applied. An example of a scan statistic that may handle the spatial scan statistic model for clustering is the SaTScan system. SaTScan may be used to detect space-time clusters with a cylindrical shape, representing a circular region in space for the entire duration of an interval in time.

SUMMARY OF THE INVENTION

The cylindrical shape may not represent clusters that shrink or grow with time. Also, it may not represent movement of the phenomenon over time. The exhaustive search based on a grid that is utilised by systems like SaTScan may not be extended to more general shapes. Therefore, a need exists for a system that at least may detect generalized space-time clusters that model such characteristics of the underlying phenomenon.

A system for detecting clusters in space and time using input data on occurrences of a phenomenon and characteristics at a plurality of locations and times includes an expectation generation module, an occurrence modeling module, a search module, a convex container module, and a solution evaluation module.

The expectation generation module determines expected occurrences of a phenomena at a plurality of locations and a plurality of times, and the occurrence modeling module determines actual, occurrences of the phenomena at a plurality of locations and a plurality of times. The search module searches the expected occurrences and the actual occurrences for a plurality of candidate solutions. Each solution is represented as a set of points in the three-dimensional space, wherein each point corresponds to a location at a time. The convex container module determines at least one solution corresponding to a selected convex container shape from the plurality of candidate solutions, and the solution evaluation module determines a strength metric for each solution determined by the convex container module, the search module selecting a solution having a desirable strength, wherein the solution having the desirable strength indicates a dominant cluster in the input data.

The search module selects a strongest solution as determined by the solution evaluation module.

A cache module may be included to save the solutions having the desired shape determined by the convex container module for previously examined sets of points.

The input data on occurrences of a phenomenon include counts and times of the occurrences of the phenomenon at the locations in a time period. The input data on characteristics of the locations and times include the populations subject to the occurrences of the phenomenon at the locations and times.

The expectation generation model generates expected counts of occurrences at the locations and times using a Poisson model.

The occurrence modeling module determines the occurrences as equal to the occurrences in the input data. The occurrence modeling module determines the occurrences at the locations and times based on their characteristics and a domain dependent model. The occurrences are determined from the population using a Poisson model.

The search module considers candidate solutions represented as sets of points and utilizes the convex container module to determine solutions having the desired shape from the candidate solutions. The candidate solutions are initialized based on the input data. Each initial candidate solution is singleton point.

The search module determines candidate solutions from solutions considered using an iterative process. Candidate solutions are created from solutions considered based on the chosen convex container shape.

The convex container module may determine a solution in various ways. For example, the convex container module determines a solution with minimum volume, given the selected convex container shape, that includes ail the points in a given candidate solution. The convex container module may determine a solution with maximum volume, given the selected convex container shape, that excludes all the points not in the given candidate solution. According to another example, the convex container module may determine a solution that maximizes a measure representing the equality between the set of points in the given candidate solution and the set of points included in the solution, given the selected convex container shape.

The solution evaluation module determines the strength metric based on all the points included in the solution and the expected occurrences determined by the expectation generation module and the occurrences determined by the occurrence modeling module.

The strength metric is based on the likelihood ratio using the spatial scan statistic.

BRIEF DESCRIPTION OF THE DRAWINGS

Preferred embodiments of the present invention will be described below in more detail, with references to the accompanying drawings.

DETAILED DESCRIPTION OF PREFERRED EMBODIMENTS

The detection of three-dimensional clusters in space and time is used for determining localized occurrences of a phenomenon of interest. Data comprising space and time information is analyzed to determine where and when the phenomenon of interest appears. A system and/or method analyze the input data to determine a phenomenon of interest and use a user selected three dimensional shape to determine properties of the phenomenon.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 1:
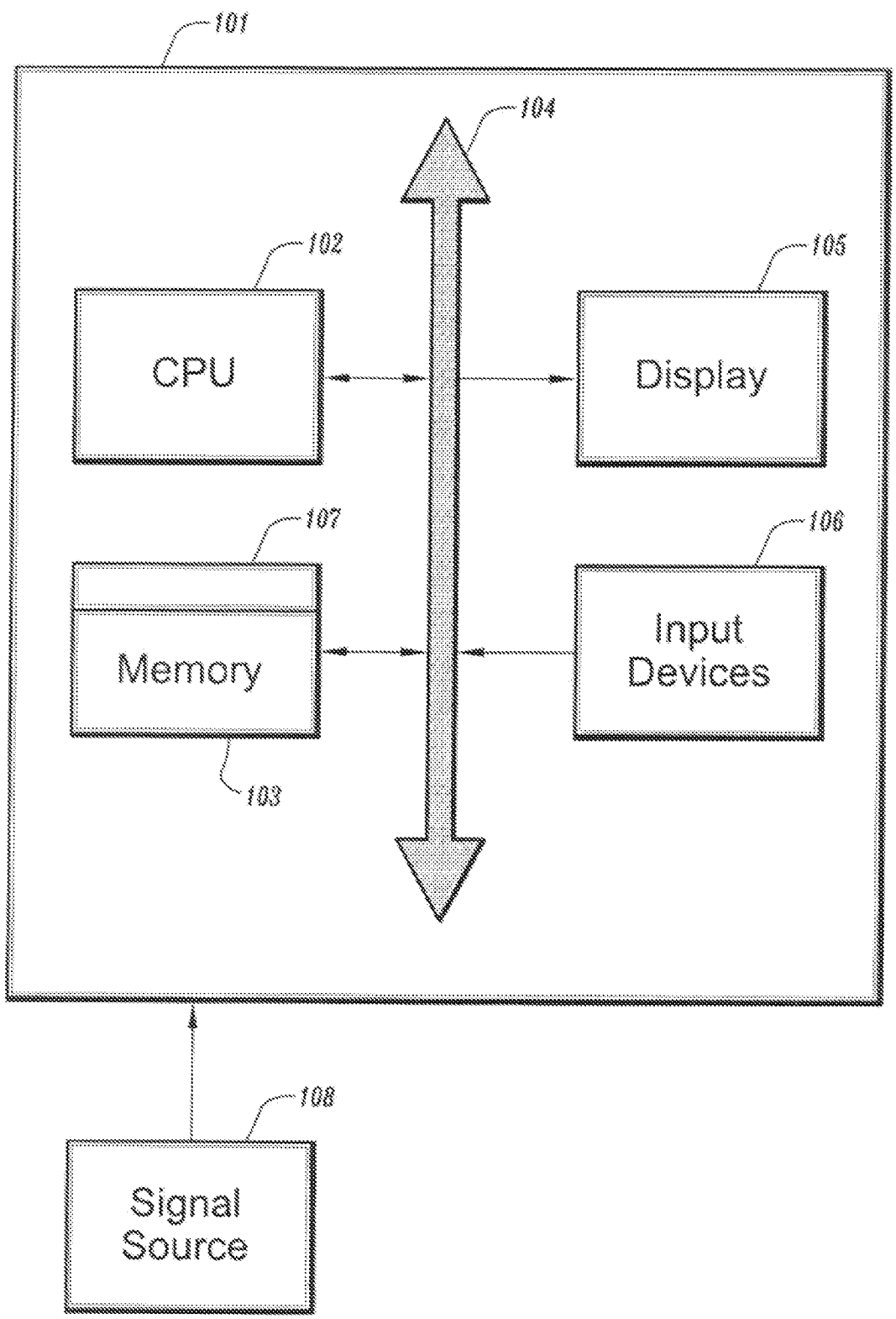
FIG. 1 is an illustration of a system according to an embodiment of the present disclosure.

Referring to FIG. 1, according to an embodiment of the present disclosure, a computer system 101 for implementing the present invention may comprise, inter alia, a central processing unit (CPU) 102, a memory 103, and an input/output (I/O) interface 104. The computer system 101 is generally coupled through the I/O interface 104 to a display 105 and various input devices 106 such as a mouse and keyboard. The support circuits may include circuits such as cache, power supplies, clock circuits, and a communications bus. The memory 103 may include random access memory (RAM), read only memory (ROM), disk drive, tape drive, etc., or a combination thereof. The present invention may foe implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations of the present invention.

Figure 2:
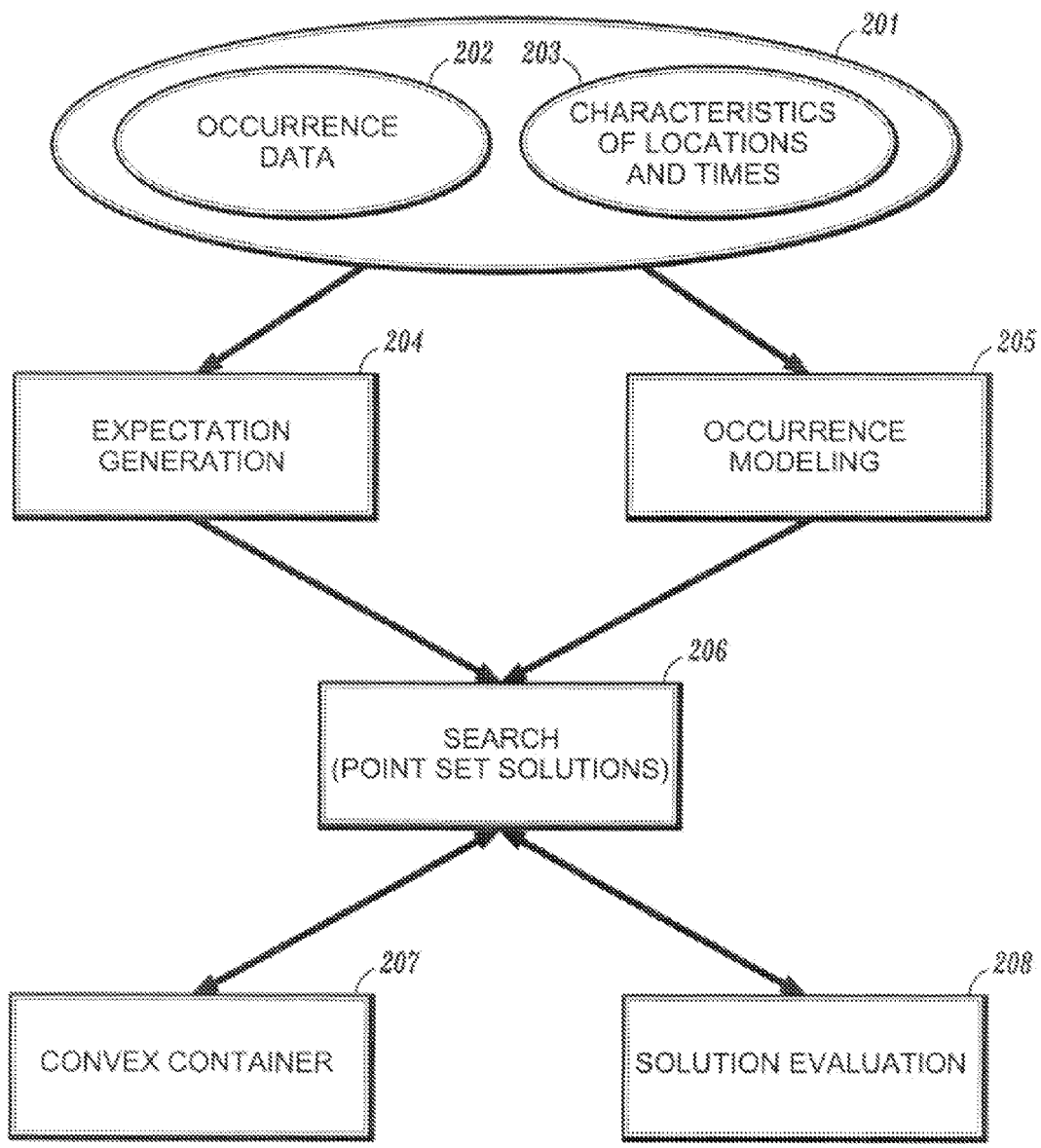
FIG. 2 is an illustration of a system according to an embodiment of the present disclosure.

Referring to FIG. 2, a system and method for detecting space-time clusters is depicted. The clusters detected by this system may model growth or shrinkage over time of the phenomenon of interest. The clusters may also model movement of the phenomenon of interest with time. The input data 201 comprises information on the occurrences of the phenomenon being analyzed by locations and times 202, and the characteristics of these locations and times 203. The system is applicable in various domains. The information on the occurrences of the phenomenon 202 is the counts of the occurrences for each combination of location and time for the region, and time period of interest. For example, in the public health domain, the information on the occurrences of the phenomenon 202 may comprise counts of occurrences of a particular disease for each county and month/year. The characteristics of these locations and times 203 comprises population counts that are subject to the phenomenon at each combination of location and time. For example, the characteristics of these locations and times 203 may comprise the population of the counties being considered at various times in the period of interest along with other relevant demographic information on the population (e.g., age, gender, etc.). A selected convex container shape for the detected clusters determines the properties of the phenomenon that may be modeled.

Referring to FIG. 2, the expectation generation module 204 determines the expected occurrences at the locations and times using the input data. The expected values are determined using the input characteristics of locations and times 203 and a domain dependent model for the expected behavior in the absence of any clustering. For example, in the epidemiology domain the expected counts for the occurrences of a disease may be modeled in the absence of any clustering using the Poisson distribution based on the population. Consider the analysis of the occurrences of a disease in a set of counties over an interval of a time. The expected disease counts for any county in any year may be determined as being proportional to the population of the county during that year. Consider the example where the total number of disease cases in 10 counties over 10 years is 1000 and the total population is 100000 over all the 10 counties in each of the 10 years. The expected number of cases in a county with a population of 20000 in one year is 20. Other characteristics of the population may also be available. Demographics of the population like age and gender may be factored into the expectation generation by well-known statistical methods like indirect standardization.

Referring to FIG. 2, the occurrence modeling module 205 determines the occurrences at each location and time. The occurrence modeling module 205 operates in different modes. A first mode is used to determine a strongest cluster in the input data of occurrences, where the strength of the cluster is determined by the solution evaluation module 208. In the first mode, the occurrence modeling module 205 uses the occurrences of the phenomenon 202 of the input data for analysis. Occurrence counts for the phenomenon are determined by location and time. A second mode is used to determine the strongest cluster of occurrences in a simulated environment. The model used as the basis for the expectation generation module 204 (e.g., a random sampling using a Poisson distribution) is used to determine the occurrences in the simulated environment. In the second mode, the occurrence modeling module 205 determines the occurrences based on the characteristics of the locations and times provided in the characteristics of these locations and times 203 of the input data using the model for expected occurrences in the absence of any clustering. For example, the occurrences are determined by random sampling from a Poisson distribution where the expected counts are proportional to the population information in the characteristics of these locations and times 203 of the input data. Other information, such as demographics in the characteristics of these locations and times 203 of the input data may be factored in using modeling methods including, for example, indirect standardization. In the second mode the clusters in the random data of occurrences are determined. Experiments with these random data are used to determine the likelihood of finding clusters by chance that are comparable in strength to the strongest cluster detected in the actual data of occurrences. The cluster detected in the actual data of occurrences is significant if such strong clusters are unlikely to exist in the random datasets.

Referring to FIG. 2, solutions in the search module 206 are represented toy a set of points, where each point corresponds to a specific location at a specific time. The search module 206 calls the convex container module 207, wherein the convex container module 207 generates a solution corresponding to a user selected convex container shape from any given candidate solution containing a set of points. A solution of the convex container module 207 exists if a container with the selected convex container shape may be determined that includes exactly the points in the solution. The convex container module 207 makes a list of convex container shapes available to the user. The user selects from this list the convex container shape that models the phenomenon of interest most closely as determined by the user.

A solution of the convex container module 207 may be generated in any of a plurality of methods according to an embodiment of the present invention. For example, the convex container module generates a solution with minimum volume that includes all the points in the given set. According to another example, the convex container module generates a solution with maximum volume that excludes all the points not in the given set. According to yet another example, the convex container module generates a solution that is closest to the given set of points using a measure of equality between the given set of points and the set of points included in the solution. A measure of equality between two sets is the number of items that are only in one of the sets and minimizing this number would make the two sets closer to each other.

A cache module may be added to the cluster detection system for efficiency purposes. The cache module stores the solutions generated by the convex container module 207 for previously encountered sets of points. If a set of points is encountered more than once, the solution for it may be gotten from the cache module instead of invoking the convex container module again.

Figure 3A:
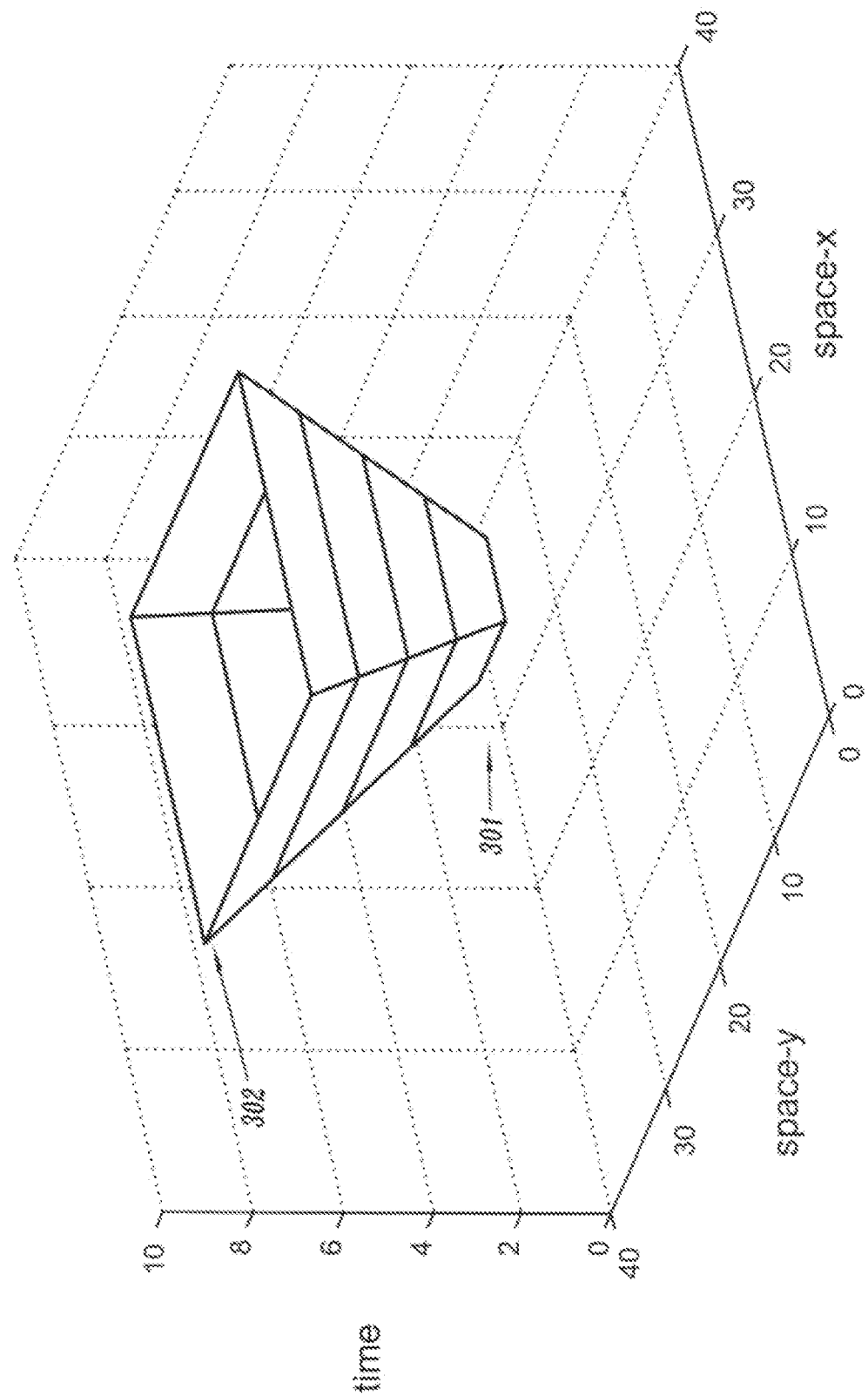
FIGS. 3A and 3B are illustrations of a cluster with a truncated square pyramid shape according to an embodiment of the present disclosure where the three dimensional view is given in FIG. 3A and the two dimensional projection from the top on to the spatial plane is given in FIG. 3B.
Figure 3B:
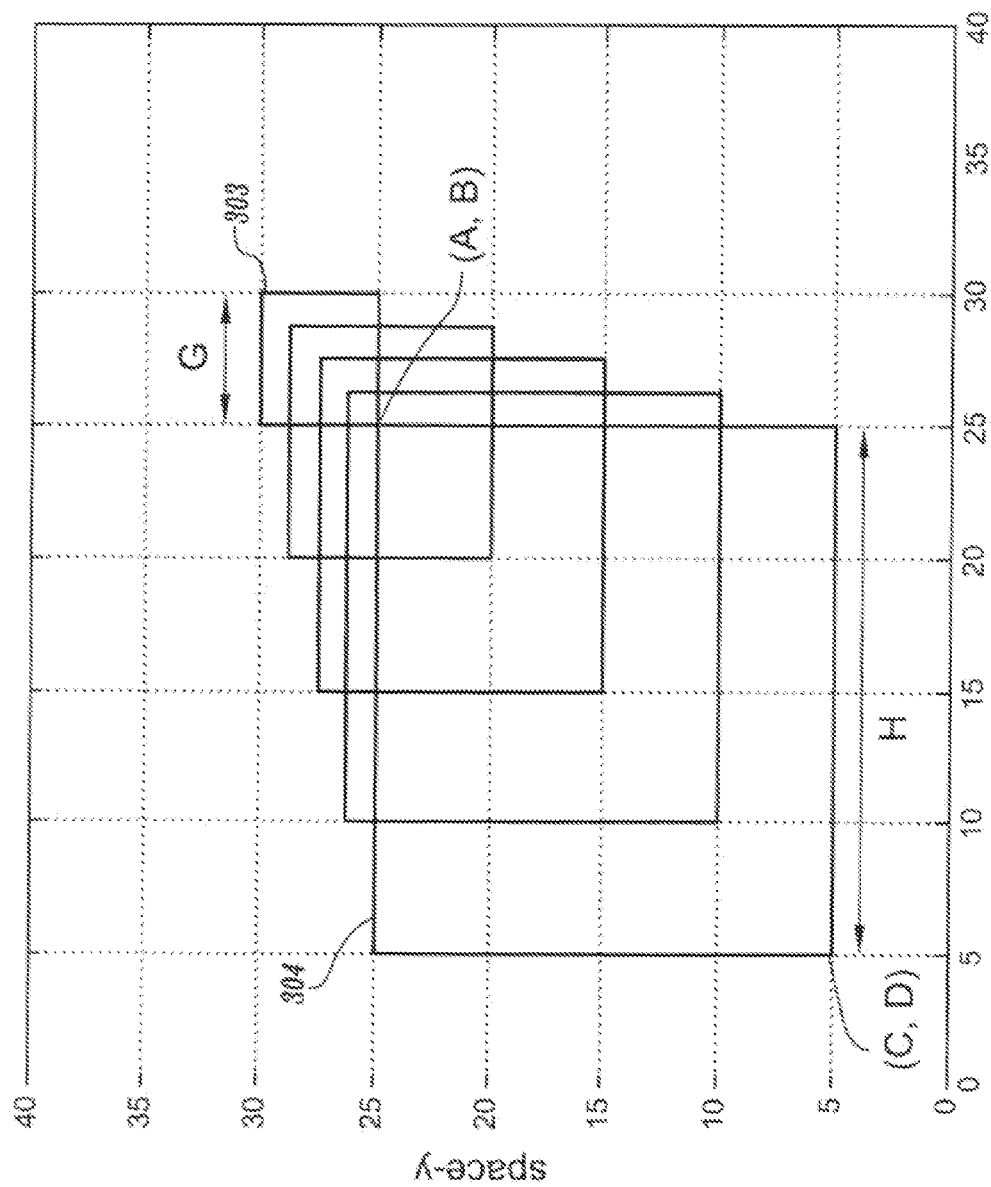
Figure 4:
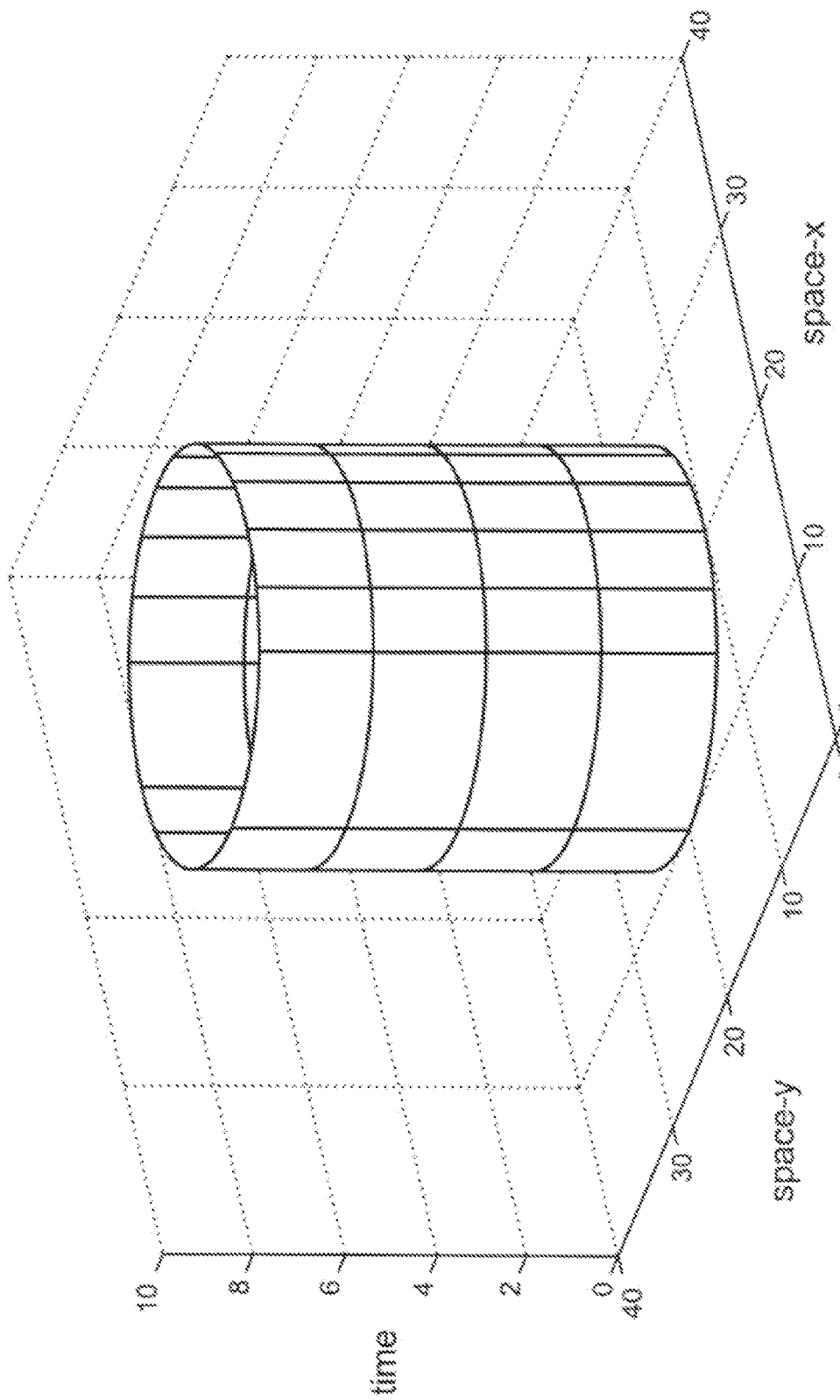
FIG. 4 is an illustration of a cluster with a cylindrical shape.

Convex container shapes may take any of a plurality of shapes. For example, a truncated pyramid with a square cross-section, where the square cross-section at any time in an interval represents the spatial extent of the cluster at the time. An example of a three-dimensional square pyramid cluster is shown in FIGS. 3A and 3B. FIG. 3A shows the three-dimensional view and FIG. 3B shows the boundaries of the square pyramid cluster at discrete times in the projection from the top on to the spatial plane. Contrast the flexibility of the square pyramid cluster of FIG. 3A with the cylindrical shape in the prior art shown in FIG. 4. The square pyramid shape of FIG. 3A may model growth or shrinkage over time. Since the pyramid's axis along the time dimension is not restricted to be orthogonal to the two spatial axes it may also model movement over time.

Such a square pyramid may be specified by eight parameters as follows. Referring to FIG. 3A the first two parameters are the earliest time 301 and latest time 302 in the pyramid interval. Referring to FIG. 3B the next two parameters, A and B, represent the two spatial coordinates of the anchor vertex of the square cross-section 303 at the earliest time in the pyramid interval. The vertex of the cross-section with the smallest values for the spatial coordinates is chosen as the anchor vertex. Referring to FIG. 3B, the parameter G is the side of the square cross-section 303 at the earliest time in the pyramid interval. Similarly, the parameters C and D represent the spatial coordinates of the anchor vertex and the parameter H is the side of the square cross-section 304 at the latest time in the pyramid interval. The volume of the square pyramid is proportional to $(G*G+G*H+H*H)$.

Accordingly, a solution of the convex container module 207 may be generated from a given set of points by solving a quadratic programming problem in which the volume as specified above using the parameters G and H of the square pyramid is minimized. Each point in the given set leads to four linear constraints in this quadratic programming formulation. These four constraints specify that the point is contained in the cross-section of the square pyramid at the specific time corresponding to the point. The cross-section of the square pyramid may be determined from the six parameters. A,B,C,D,G and H, using linear interpolation. The quadratic programming problem may be solved using any of a plurality of methods. For example, a quadratic programming problem with linear constraints may be solved exactly using any quadratic programming library package. According to another example, the quadratic programming problem may be solved approximately by considering a set of square pyramids that contain ail the points in the given set and choosing the one with minimum volume. The square pyramid shape is one example of the convex container shapes that may be selected by the user for the convex container module 207.

Another example of a convex container shape is a truncated pyramid with a regular polygon for its cross-section. The generation of a solution by the convex container module 207 from a given set of points for this truncated pyramid container shape is an extension of the determination described above for the square pyramid. The volume of this pyramid is a similar function of the sides of the regular polygon at the minimum and maximum times of the pyramid interval. Each point in the given set leads to one linear constraint for each side of the polygon. The quadratic programming problem may be solved as described above for the square pyramid case. The truncated pyramid with a regular polygon is another example of the convex container shapes that may be selected by the user.

Figure 5A:
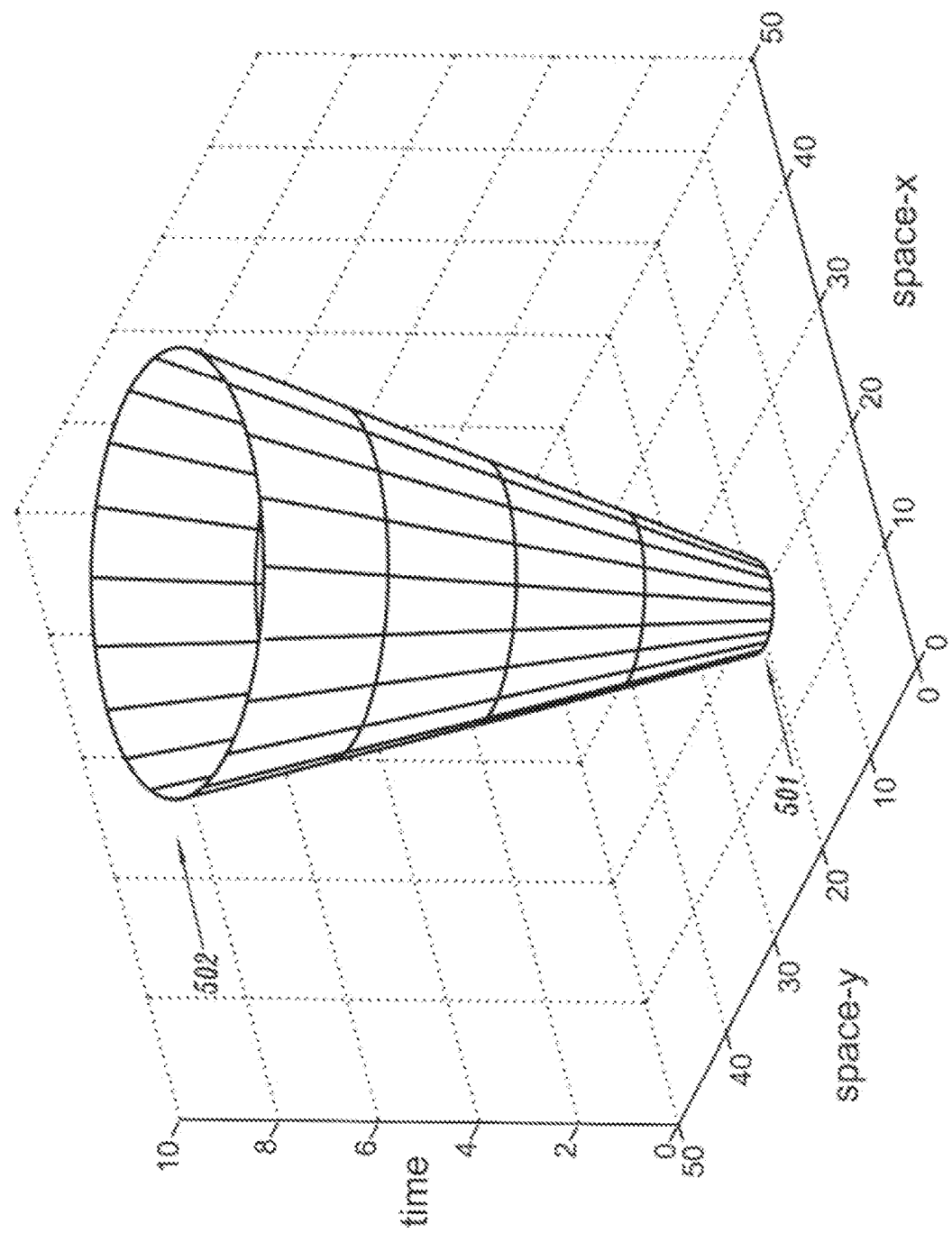
FIGS. 5A and 5B are illustrations of a cluster with a truncated cone shape according to an embodiment of the present disclosure where the three dimensional view is given in FIG. 5A and the two dimensional projection from the top on to the spatial plane is given in FIG. 5B.
Figure 5B:
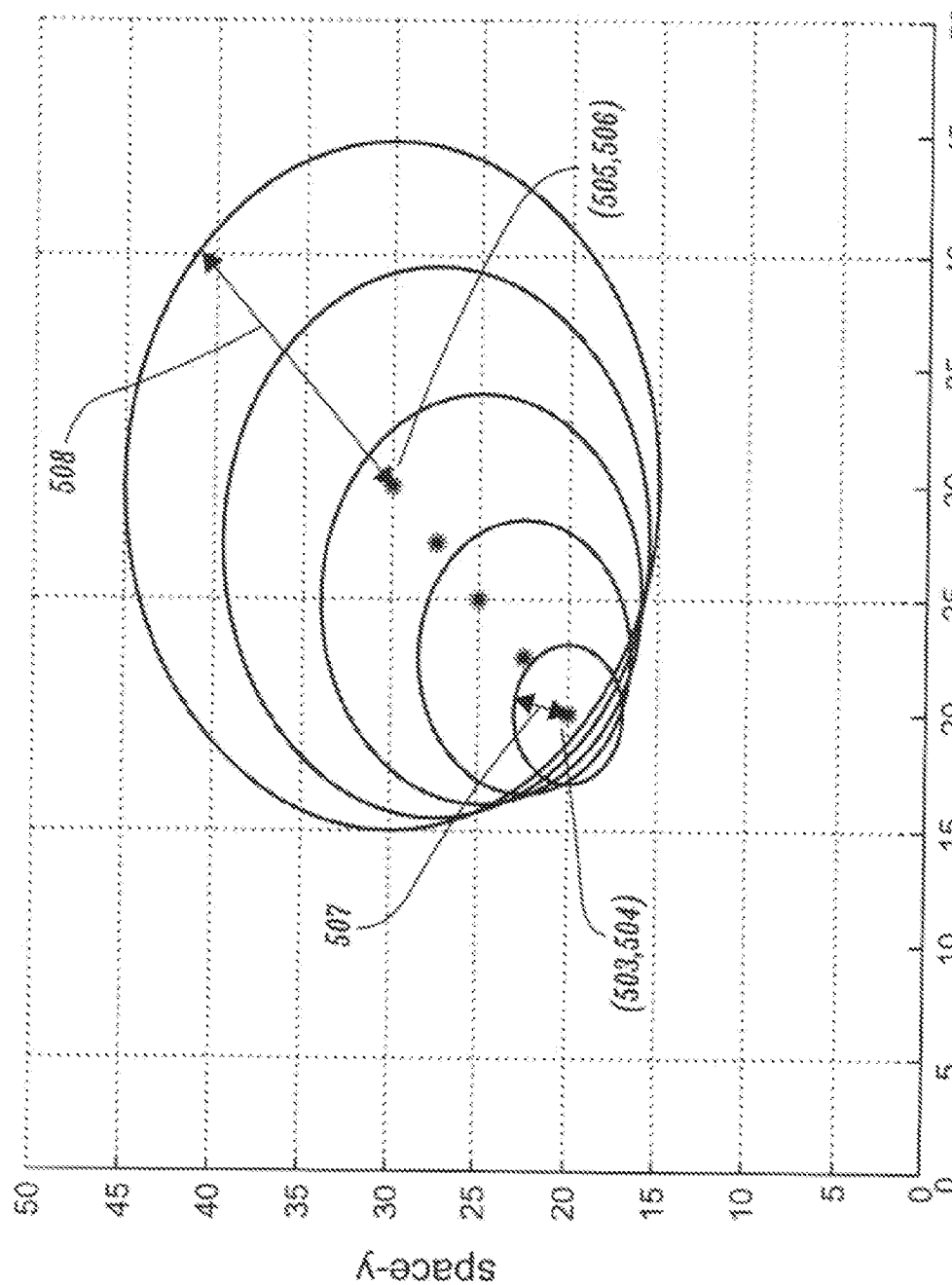

Another convex container shape that may be selected is a truncated cone with a circular spatial cross-section for each time in an interval. An example of this truncated cone is shown in FIGS. 5A and 5B. FIG. 5A shows the three-dimensional view and FIG. 5B shows the projection of the cones outline at discrete points in time on the spatial plane. The centers of the circular cross-sections of the cone are also marked (*) in FIG. 5B. A truncated cone is specified by eight parameters. Referring to FIG. 5A, the first two parameters 501 and 502 are the earliest and latest time for the cone's time interval. Referring to FIG. 5B, the next two parameters 503 and 504 are the spatial coordinates of the center of the circular cross-section at the earliest time in the cone's interval. Parameters 505 and 506 are the spatial coordinates of the center of the circular cross-section at the latest time in the cone's interval. Parameter 507 and 503 are the radii of the cross-sections at the earliest and latest times in the cone's interval, respectively. A solution of the convex container module 207 may be generated from the given set of points for this convex container shape using a non-linear optimization formulation. This formulation minimizes the volume that is a quadratic function of the two parameters representing the radii of the cross-sections at the earliest and latest times in the cone's interval. Each point in the given set leads to a non-linear constraint that specifies that it is contained within the cross-section of the cone at the specific time corresponding to the point. The constraint is easily derived by simple geometric equations for the circle once the center and the radius of the cross-section at the time corresponding to the point is determined using linear interpolation. This non-linear optimization is solved by approximate methods that consider only a subset of cones containing all the points in the given set and selecting the one with the smallest volume. The truncated cone is one of the convex container shapes that may be selected by the user.

One having ordinary skill in the art would recognise, in light of the present disclosure, that other convex containers may be used for clustering.

Referring to FIG. 2, the search module 206 searches for a strongest solution for the occurrences and expectations from modules 204 and 205 respectively, and the chosen convex container shape. The strength of a solution of the convex container module 207 is determined by the solution evaluation module 206. The search module 206 considers candidate solutions that are represented as sets of points and utilizes the convex container module 207 to generate solutions from these candidate solutions. The search module 206 creates candidate solutions in an iterative process from, solutions determined by the convex container module 207 considered earlier in the iterative process. This iterative process may be initialized to a set of candidate solutions containing single points that have non-zero occurrences. The search module 206 stores a set of solutions determined by the convex container module 207 considered earlier in the iterative process with preference to storing the stronger solutions. Candidate solutions are created from, a pair of stored solutions (P, Q) by first splitting the solutions P and Q using a random three-dimensional hyperplane and combining the pieces to create new sets of points as candidates. P and Q are chosen in a biased random fashion giving preference to the stronger solutions in the stored set of solutions. Candidate solutions are also created from a single stored solution R by modifying it based on the characteristics of the convex container shape corresponding to R. One or more points not in R but close to the convex container boundaries of the solution R are added to R to create a candidate solution. Similarly, one or more points in R and close to the convex container boundaries of the solution R are removed from R to create a candidate solution.

The occurrence information at locations and times may be used in the selection of points for addition or removal. The strongest solution determined by the solution evaluation module 208 among those solutions determined by the convex container module 207 found in the search is output as a detected cluster.

A heuristic model may be used for determining sets of points likely to contain a strongest solution fitting a convex container shape. Therefore, the search module may consider a subset of all possible sets of points while having a measure of confidence that a strongest solution fitting a convex container shape will be determined.

The search module 206 may select candidate solutions using other methods, for example, by systematically considering all candidate solutions based on a repetitive process such as a grid. This does not imply that all solutions will be explored for the chosen convex container shape. This approach may be effective for some simple shapes.

Referring to FIG. 2, the solution evaluation module 208 determines a strength for any given solution of the convex container module 207. The strength measure may be customized based on the application domain. The strength measure is based on the points included in the solution and on the occurrences and expectations for the locations and times. One example of a strength measure is the likelihood ratio based on the spatial scan statistic as described in the paper "A spatial scan statistic" by Martin Kulldorff in Communications in Statistics: Theory and Methods, Volume 26, Number 6, 1997. Another example of a strength measure is simply the number of occurrences at the points included in the solution. Consider the case where input data includes occurrences of a phenomenon at various locations and time and also the corresponding population sizes. Another example of a strength measure is the occurrence density as defined by the total number of occurrences at the points included in the solution divided by the total population corresponding to the points included in the solution. The density could also be modified to take into account the spatial extent of the solution in addition to the population. Other strength measures may also be used customized to the domain of application.

An implementation according to an embodiment of the present invention was applied to data on cancer occurrences in 32 counties over a 19 year period.

| occurrence.txt | | | | |
|---|---|---|---|---|
| Grant | 1 | 1997 | 2 | 2 |
| SanJuan | 1 | 1974 | 8 | 2 |
| Bernalillo | 1 | 1977 | 13 | 1 |
| DonaAna | 1 | 1977 | 14 | 2 |
| Union | 1 | 1977 | 16 | 2 |
| Sandoval | 1 | 1977 | 11 | 1 |
| Valencia | 1 | 1977 | 17 | 1 |
| DonaAna | 1 | 1977 | 11 | 2 |
| Valencia | 1 | 1977 | 7 | 2 |
| Bernalillo | 1 | 1975 | 13 | 1 |

The file occurrence.txt contains a portion of the input occurrence data. Each line of this file specifies the county, number of occurrences of cancer, the year of occurrence and values for the other characteristics like age group and gender of the cancer patients.

| population.txt | | | | |
|---|---|---|---|---|
| Bernalillo | 73 | 15537 | 1 | 1 |
| Bernalillo | 73 | 14931 | 1 | 2 |
| Catron | 73 | 99 | 1 | 1 |
| Catron | 73 | 99 | 1 | 2 |
| Chaves | 73 | 1888 | 1 | 1 |
| Chaves | 73 | 1867 | 1 | 2 |
| Colfax | 73 | 567 | 1 | 1 |
| Colfax | 73 | 526 | 1 | 1 |
| Curry | 73 | 2192 | 1 | 1 |
| Curry | 73 | 2130 | 1 | 2 |

| location.txt | | |
|---|---|---|
| Bernalillo | 66 | 102 |
| Catron | 8 | 57 |
| Chaves | 126 | 47 |
| Colfax | 123 | 162 |
| Curry | 161 | 79 |
| DeBaca | 132 | 82 |
| DonaAna | 64 | 11 |
| Eddy | 136 | 13 |
| Grant | 22 | 25 |
| Guadelupe | 129 | 97 |

Figure 6:
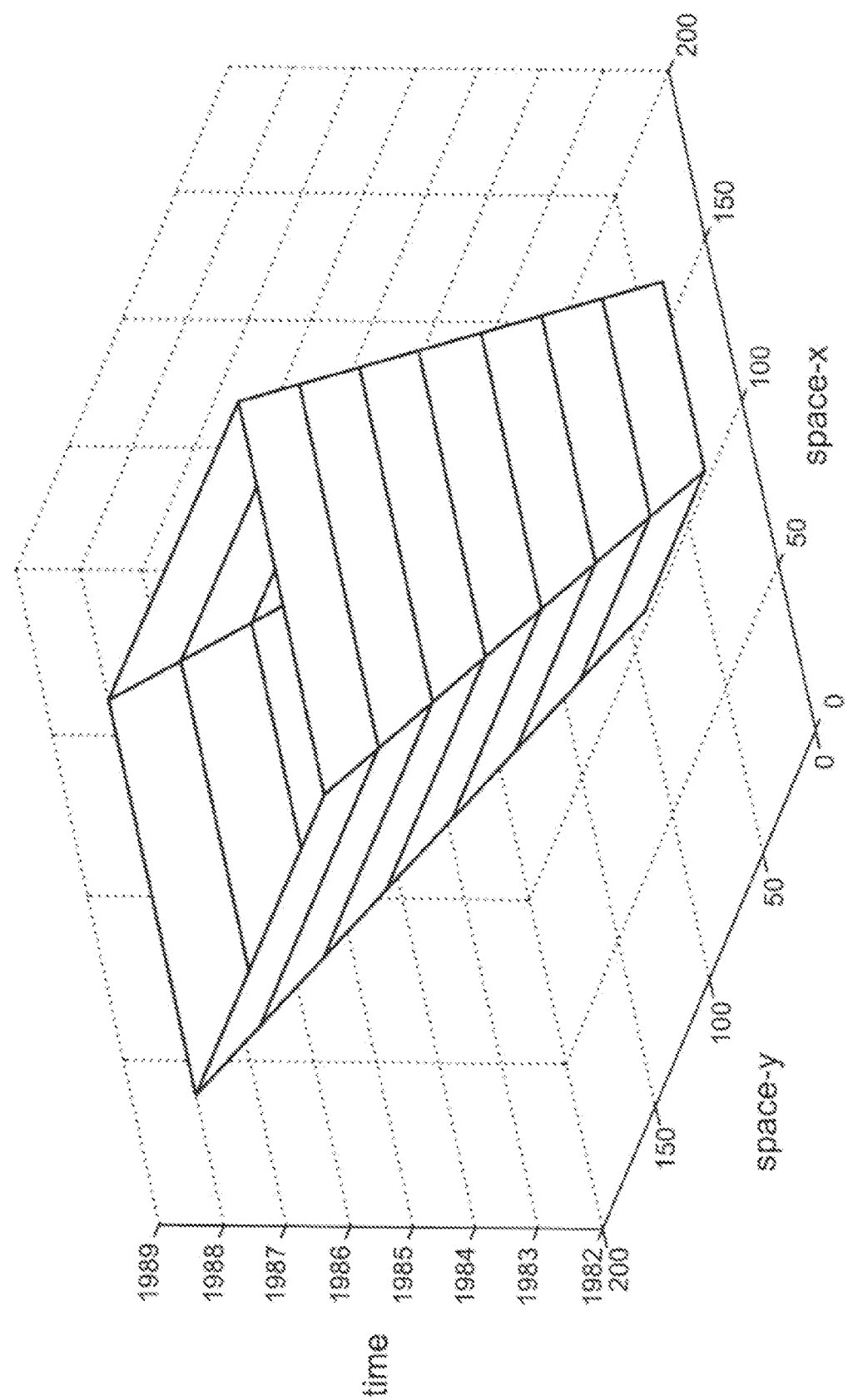
FIG. 6 shows results according to an embodiment of the present disclosure for cancer data using a square pyramid as a selected convex container shape.

The files location.txt and population.txt contain a portion of the characteristics of the locations and times. The file location.txt contains the Cartesian coordinates defining the location of each county being analyzed. Each line of the file population.txt contains a county name, year, and population for each set of values of the other characteristics (e.g., age group and gender). The cluster detected with the square pyramid as chosen convex container shape is shown in FIG. 6. This cluster extends from year 1982 to the year 1989. There are 292 cases included in this cluster, which is significantly larger than the 211.57 expected if there were no clusters using the Poisson model and indirect standardization. The results in FIG. 6 demonstrate how the system and method are able to capture characteristics like growth and movement in the phenomenon (e.g., cancer occurrences) that would not be possible with the prior art.

Figure 7:
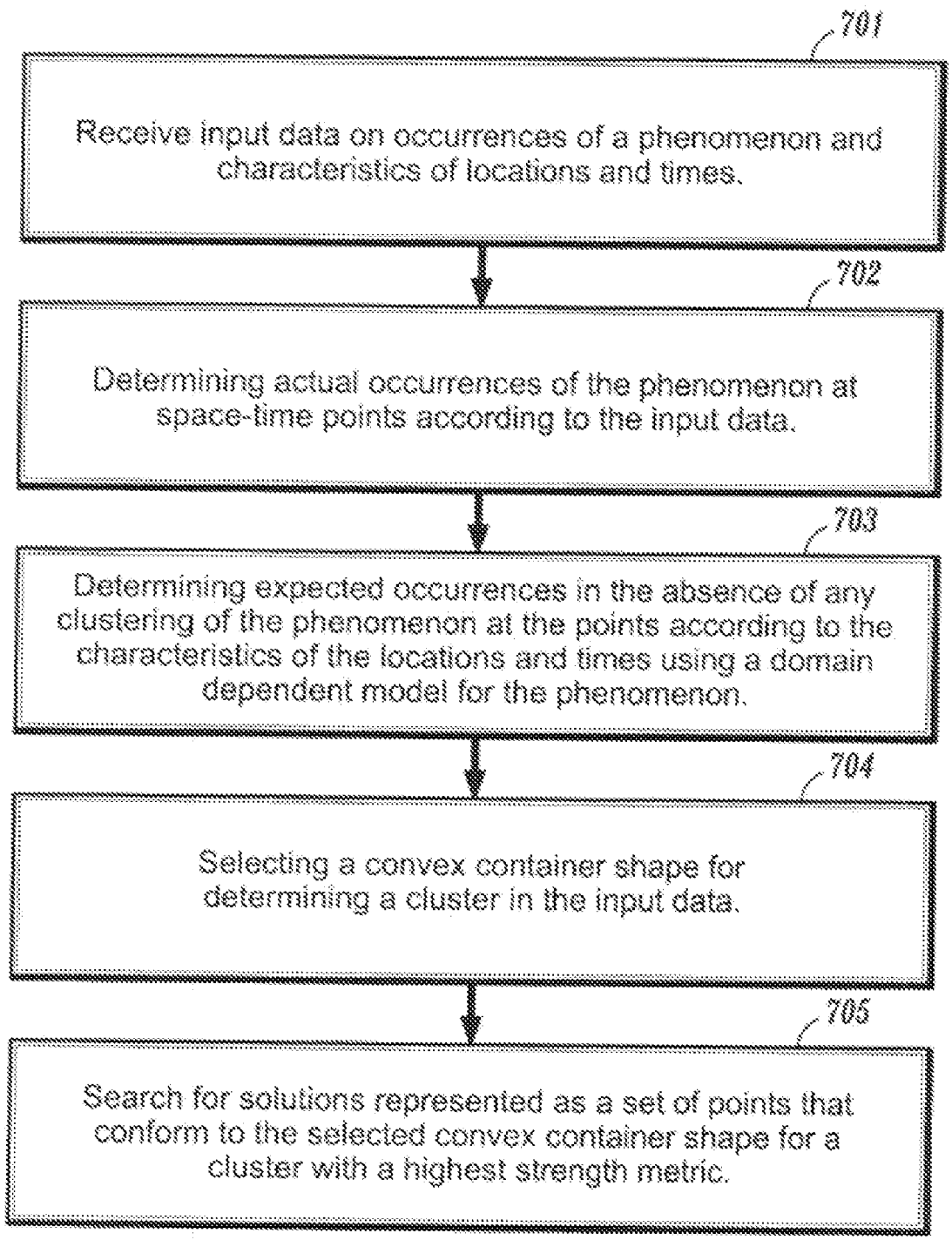
FIG. 7 is a flow chart of a method according to an embodiment of the present disclosure.

Referring to FIG. 7, a method according to an embodiment of the present disclosure takes as input data on occurrences of a phenomenon at locations and times and data on characteristics of the locations and times 701. The occurrences of a phenomenon and characteristics of locations and times are given for points in space and time. Actual occurrences of the phenomenon are determined at the points according to the input data 702. Expected occurrences are determined in the absence of any clustering of the phenomenon at the points according to the characteristics of the locations and times using a domain dependent model for the phenomenon 703. A convex container shape is selected for determining a cluster in the input data 704. The convex container shape may be selected at any time before searching for solutions. Solutions represented as a set of points are sought that conform to the selected convex container shape for a cluster with a highest strength metric that is based on the number of occurrences included in the cluster and the input data 705.

Having described embodiments for system for detecting generalized space-time clusters, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A non-transitory program storage device is provided readable by machine, tangibly embodying a program of instructions automatically executable by the machine to perform a method for determining a cluster, the method comprising:
   receiving input data on occurrences of a phenomenon at locations and times and data on characteristics of the locations and times;
   determining actual occurrences of the phenomenon at the three-dimensional space-time points according to the input data;
   determining expected occurrences using a domain dependent model for the phenomenon, wherein the expected occurrences are a random sampling of the data on characteristics of the locations and times;
   searching the expected occurrences for a first plurality of candidate solutions and the actual occurrences for a second plurality of candidate solutions;
   determining a strength of each of the first and second plurality of candidate solutions;
   selecting a convex container shape from the second plurality of candidate solutions having a strength unlikely to exist in the expected occurrences for determining a cluster in the input data; and
   determining a solution represented as a set of points that conforms to a volume of the selected convex container shape for a cluster.

2. The program storage device of claim 1, wherein the method further comprises caching solutions conforming to the selected convex container shape.

3. The program storage device of claim 1, wherein determining expected occurrences further comprises generating expected counts of occurrences at the locations and times using a model.

4. The program storage device of claim 1, wherein the method further comprises
   determining a dominant cluster in the input data according to the strengths of the plurality of candidate solutions.

5. A method for detecting clusters in space and time using input data on occurrences of a disease in a population and characteristics of the population at a plurality of geographic locations and times comprising:
   determining expected occurrences of the disease at a plurality of geographic locations and a plurality of times;
   determining actual occurrences of the disease at a plurality of geographic locations and a plurality of times;
   searching the expected occurrences and the actual occurrences for a plurality of candidate solutions, wherein each solution is represented as a set of points in a three-dimensional space, and wherein each point corresponds to a geographic location at a time;
   determining at least one solution corresponding to a selected convex container shape from the plurality of candidate solutions, wherein the convex container module determines a solution that maximizes a measure representing the equality between the set of points in the given candidate solution and the set of points included in the solution, given the selected convex container shape; and
   determining a strength metric for each solution determined by the convex container module, the search module selecting a solution having a desirable strength, wherein the solution having the desirable strength indicates a dominant cluster in the input data corresponding to a detected cluster of the disease in the population.

6. The method of claim 5, further comprising selecting a strongest solution based on the strength metric.

7. The method of claim 5, further comprising saving the solutions having the desired shape for previously examined sets of points.

8. The method of claim 5, further comprising generating expected counts of occurrences at the geographic locations and times using a Poisson model.

9. The method of claim 5, further comprising determining the occurrences as equal to the occurrences in the input data.

10. The method of claim 5, further comprising determining the occurrences at the geographic locations and times based on their characteristics and a domain dependent model.

11. The method of claim 10, further comprising determining the occurrences from the population using a Poisson model.

12. The method of claim 5, further comprising considering candidate solutions represented as sets of points and utilizes the convex container module to determine solutions having the desired shape from the candidate solutions.

13. The method of claim 12, wherein the candidate solutions are initialized based on the input data.

14. The method of claim 12, further comprising determining candidate solutions from solutions considered using an iterative process.

15. The method of claim 14, wherein candidate solutions are created from solutions considered based on the chosen convex container shape.

16. The method of claim 5, further comprising determining a solution with minimum volume, given the selected convex container shape, that includes all the points in a given candidate solution.

17. The method of claim 12, further comprising determining a solution with maximum volume, given the selected convex container shape, that excludes all the points not in the given candidate solution.

18. The method of claim 5, further comprising determining the strength metric based on all the points included in the solution and the expected occurrences and the occurrences.

* * * * *